Figure 1:
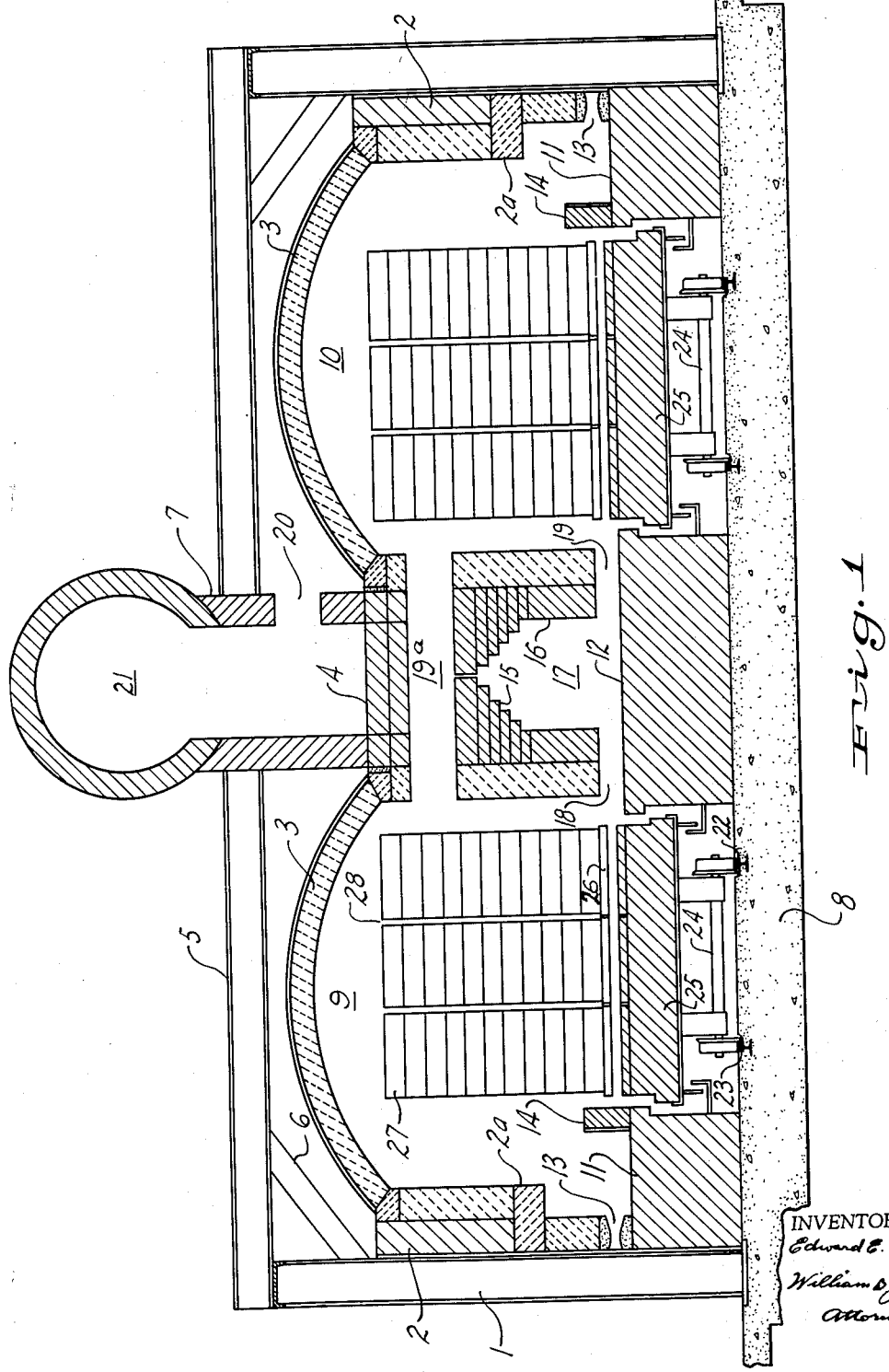

March 13, 1962 E. E. DAVIS ET AL 3,024,514
SHUTTLE CAR KILN

Filed June 24, 1957 3 Sheets-Sheet 2

INVENTOR.
Edward E. Davis
BY William B. Jaspert
Attorney.

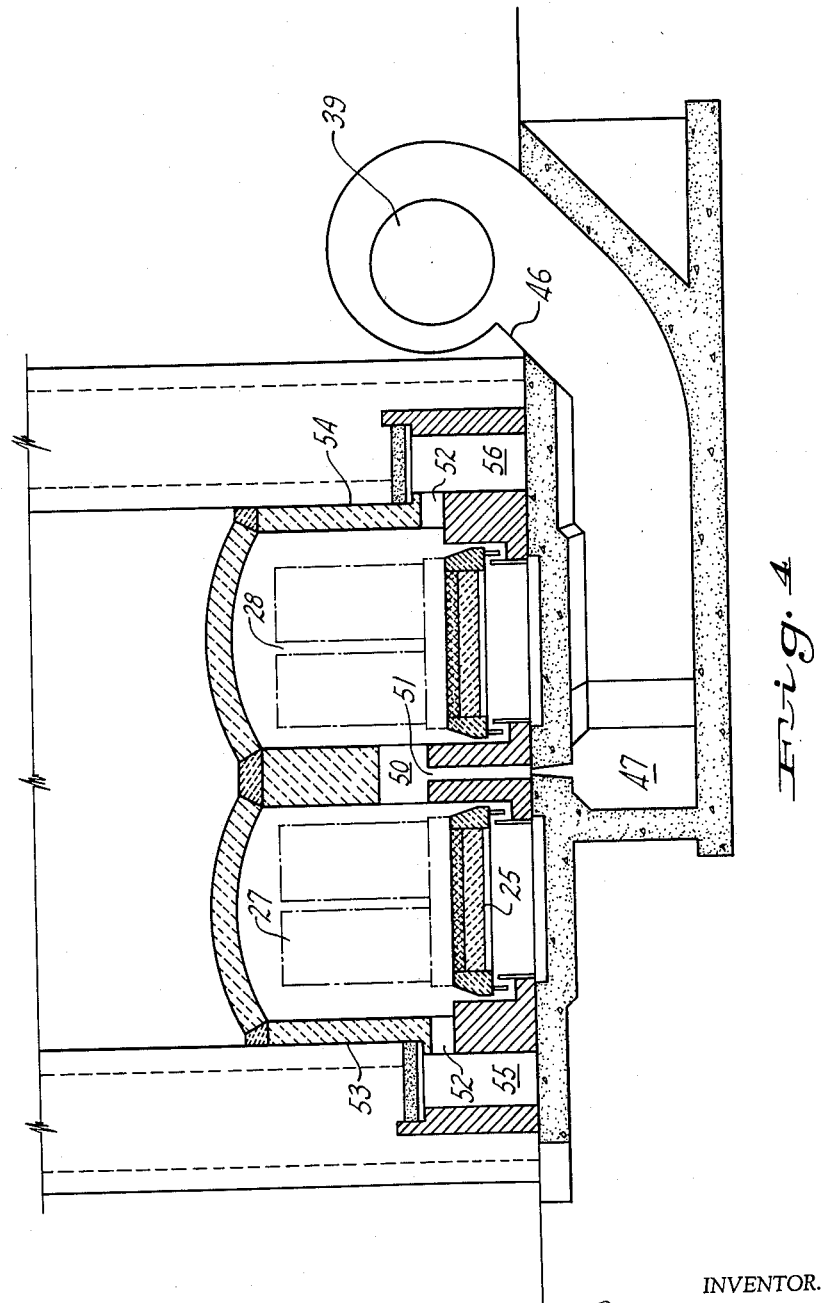

United States Patent Office 3,024,514
Patented Mar. 13, 1962

3,024,514
SHUTTLE CAR KILN
Edward E. Davis, Oak Hill, Ohio, and Charles W. Taylor, Salisbury, N.C.
Filed June 24, 1957, Ser. No. 667,322
3 Claims. (Cl. 25—142)

This invention relates to new and useful improvements in kilns for firing clay products, more particularly refractory clay brick and shapes for use in metal pouring ladles and for the roofs, arches and hearths of steel melting furnaces or the like, and it is among the objects thereof to provide a design of kiln which consists of a drying kiln and a firing kiln as two independent units arranged in tandem relation in which the products of combustion of the firing kiln are utilized for heating and creating the proper treating atmosphere in the drying kiln.

The molded clay brick or shapes are stacked on trucks having wheeled axles supported on tracks running through and connecting the drying and firing kilns and it is among the objects of the invention to provide what may be termed a shuttle kiln in which the pre-treated or dried clay products are transferred to a firing kiln as distinguished from the conventional continuous kiln. It is a further object of the invention to control the manner of firing the clay articles to obtain uniformity of quality and color throughout the stacked product within a minimum of time and with a minimum fuel input.

It is a further object of this invention to apply a new principle of cross-firing by arranging the burner ports at hearth level to direct the burner flame transversely of the stacked clay shapes and cause the rising products of combustion to reverberate from the roof or arch of the kiln instead of stratifying in the direction of the stack.

It is still another object of this invention to employ a kiln chamber having a partition wall extending down the longitudinal center with a longitudinal flue and having transverse exhaust passages leading from the firing chamber to the flue at substantially hearth level, the partition wall being spaced from the roof or arch of the kiln chamber to provide an equalizing passage to maintain uniform pressure; on opposite sides of said partition.

Figure 2:
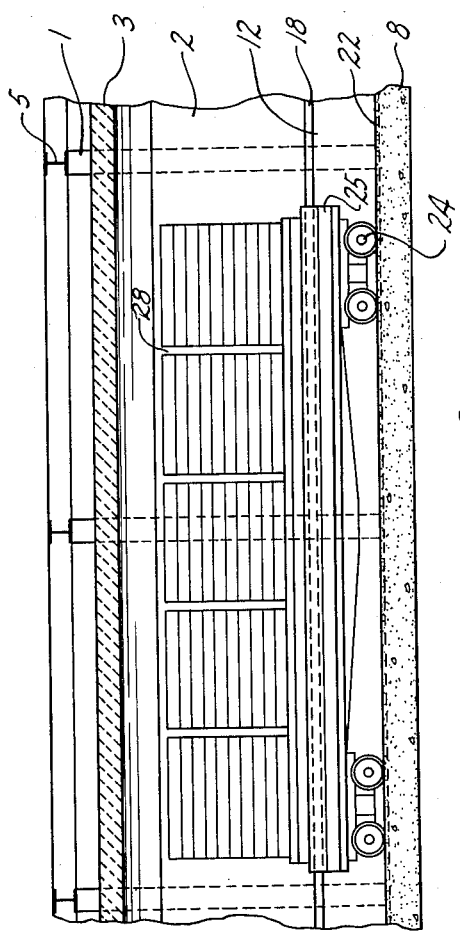
Figure 3:
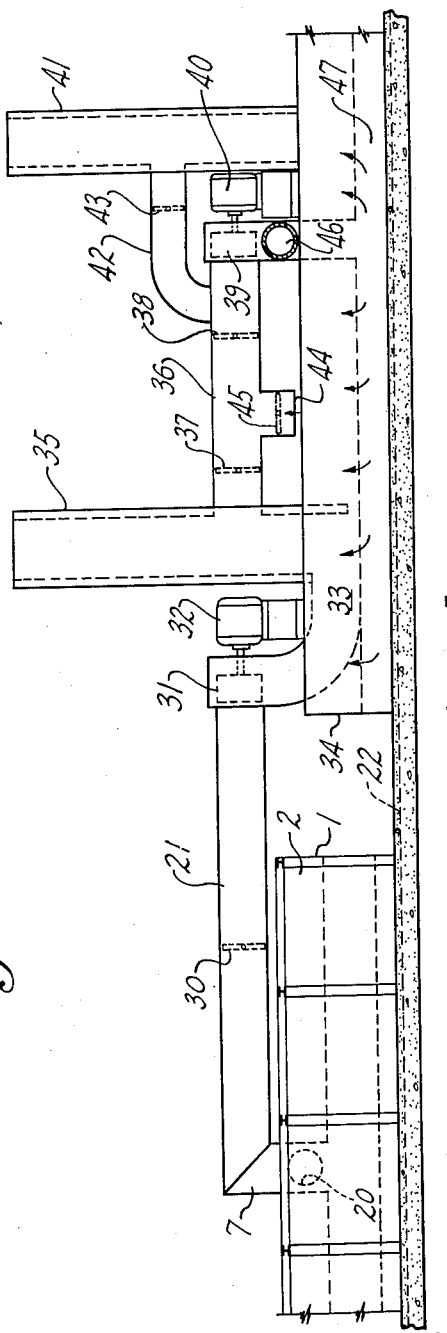

Other objects of the invention will become more apparent from a consideration of the accompanying drawings constituting a part hereof in which like reference characters designate like parts and in which:

FIGURE 1 is a vertical cross-sectional view of a firing kiln embodying the principles of this invention;

FIGURE 2, a vertical cross-section taken longitudinally of the furnace showing one of the shuttle cars in side elevation;

FIGURE 3 is a side elevational view of a portion of the firing kiln and a portion of the drying kiln embodying the principles of this invention; and FIGURE 4 is a vertical cross-section of the drying kiln.

With reference to FIGURE 1 of the drawing, the numeral 1 designates the buckstays for supporting the refractory side walls 2 of a kiln having a refractory arch 3 supported on the side wall 2, and a center wall 4, beams 5 with angle braces 6 support the walls 2, the arch 3 and a duct 7 leading to a stack, as will be hereinafter explained. A foundation 8 of concrete or the like extends across the kiln which consists of two parallel tunnel chambers generally designated by the numerals 9 and 10, the walls and hearth of which are of like construction, as shown in FIGURE 1 of the drawing. Within the tunnels there are provided side hearths 11 and a central hearth 12 and firing ports 13 are provided in the side walls 2. Side walls 2 are provided with an overhanging wall portion 2a which directs the products of combustion transversely of the tunnels at hearth level. Baffle blocks 14 are set up in the path of the burner flames from the ports 13 to divert them to prevent their impinging against the stacked clay shapes. Above the center hearth 12 there is a flue construction consisting of the staggered arch blocks 15 and side walls 16 to form the passage 17 that communicates with the duct 7 above. Bottom flue passages 18 and 19 conduct the products of combustion as they are reverberated by the arches 3, a cross duct 19a being provided to equalize the pressures across and within the tunnels 9 and 10. An opening 20 is provided in the duct in which to vent cold air into the flue 21 which vents the products of combustion from the tunnels 9 and 10 through passage 17 and directs it to the drying kiln as will be hereinafter explained.

The floor 8 of the kiln is provided with rails 22 and 23 for supporting the wheeled axles 24 of cars 25. The flat body of the shuttle cars are constructed of refractory clay materials such as refractory brick, that in turn support hollow hearth tile 26 which have passages that function as flues for the products of combustion passing across the trucks 25. The shapes to be fired, such as clay brick, are stacked on the hearth tile 26 of the trucks, as indicated by the reference numeral 27, the bricks being staggered and spaced to form a series of cross flues and passages such as shown at 28 in FIGURES 1 and 2, so that the products of combustion can freely pass transversely and vertically through the stacked shapes. The loaded cars 25 are charged into the drying and firing kilns from end-to-end and are stationary during the drying and firing of the ware.

The stack duct 21, FIGURES 1 and 3, has a valve 30, the duct being evacuated by a kiln fan 31 operated by motor 32 to withdraw the products of combustion into the hot air end 33 of the vent 35. The stack or vent 35 exhausts the products of combustion to the atmosphere except as they are drawn to other parts of the drying kiln connected by a duct 36 controlled by dampers or valves 37 and 38. A dryer fan 39 operated by a motor 40 draws the products of combustion through the duct 36 from which they can be passed to the center flue or stack 41 through duct 42 controlled by valve 43. An air vent 44 with a valve 45 draws in air to control the humidity and temperature and some of the products of combustion drawn through the duct 36 may be delivered direct to the duct 46 and thence underneath the drying kiln through the flue 47 and is distributed at spaced intervals along the drying kiln through passages at hearth level, as shown by the arrows FIGURE 3, where it passes through the spaces 28 of the stacked ware on the trucks 25 transversely and upward. The rails 22 and 23, shown in FIGURE 1, extend across the drying and firing kilns as shown in FIGURE 3, so that the trucks can pass therebetween over the rails after they leave the drying kiln 34 and enter the firing kiln at 1, FIGURE 3.

The construction of the drying kiln shown in FIGURE 4 is similar to the firing kiln of FIGURE 1, in that the hearth level of the shuttle cars 25 is in a horizontal plane with hot air inlet passages 50 communicating with flue 47 by passages 51. The products of combustion from the firing kiln are thus utilized to dry the clay shapes 27 stacked on cars 25 by passing across the stacked ware and therefore through passages 28 to the exit passages 52 at the outer walls 53 and 54 to exhaust flues or vents 55 and 56 while the loaded cars are resting in the drying kiln. By arranging the loaded cars on the pairs of double tracks throughout the length of the kiln on both sides of the hot air inlet passages 51, all the stacked ware is subject to the same uniform drying temperature.

The temperature and humidity may be controlled in the drying kiln by means of the cold air inlet 44 and the by-pass or humidity flue 42 so that only a desired portion of the products of combustion from the firing kiln enters the duct 46 and the bottom flues 47 of the drying kiln.

Likewise, the temperature can be controlled in the products of combustion leaving the firing kiln by the damper or valve 30 and the fan 31, the air inlet 20 supplying cold air as needed.

The principal firing control is exercised by the burners in the burner ports 13, of which there are a good many on each side of the kiln, depending upon the length of the kiln; for example, a kiln 96 feet long would have 22 burners on each side, which is about 4 feet apart, and the cars that carry the ware are approximately 10 feet long, so that there would be 9 or 10 such cars in each of the tunnels 9 and 10.

The baffle blocks 14 are employed so that the burner flame does not contact the clay shapes during initial stages of firing, which would cause a discoloration. By controlling the ratio of air to gas in the burners, the rate of firing can be maintained at a maximum without discoloring the product resulting in uniform firing of the stacked ware on top of the cars 25.

The reverberation of the products of combustion by the arches 3 of the tunnels 9 and 10 causes it to pass downward through the passages 28 of the stacked shapes and the burners on the sides being at the hearth level of the cars 25 cause the products of combustion to pass transversely of the stacked ware, thus assuring a uniform heat throughout the stacked ware or shapes.

One of the outstanding features of the present type kiln is that the temperature can be maintained substantially uniform from the top of the arch to the top of the hearth so that the stacked ware is subjected to uniform firing throughout. By using a pair of parallel tunnels with burner ports on the outer walls and the exhaust flues 18 on the inner walls with the pressure equalizing passage 19a between the tunnel chambers, uniformity of temperature and firing control is obtained at all times.

It will be noted that by means of the center flue construction at hearth level within the tunnel chambers, a plurality of relatively small arches may be employed for the roof of the tunnels 9 and 10 instead of a single large arch which may be subject to high stresses when firing highly refractory products, such as silica brick, for example.

Although one embodiment of the invention has been herein illustrated and described, it will be evident to those skilled in the art that various modifications may be made in the details of construction without departing from the principles herein set forth.

We claim:

1. In combination a pair of tunnel kilns each separated by a partition wall and having a pair of parallel tracks extending longitudinally therethrough, parallel rows of shuttle cars mounted on said tracks having clay shapes to be fired stacked thereon, the supporting surfaces of the cars constituting hearths, said cars being stationary during the firing and drying of said clay shapes, one of said kilns having a plurality of burners uniformly spaced along the longitudinal extent of the tunnel at both side walls thereof and having an exhaust flue in the center wholly contained within the partition wall between said pair of parallel tracks with longitudinally spaced exhaust passages the full length of the tunnel, the burner ports and exhaust passages being at hearth level with the supporting surfaces of said shuttle cars to cause the products of combustion from said burners to pass transversely of the tunnel only in separately controllable heating zones to maintain a uniform firing temperature throughout the transverse and longitudinal extent of said tunnel, the exhaust flue of said firing kiln being connected to conduct the products of combustion to the inlet passages at the center of the other of said kilns for drying the clay products stacked on the shuttle cars stationed therein, said drying kiln having a central partition wall with a flue and outlet passages at the level of the shuttle car hearths for directing the products of combustion from the first-named kiln to the center of the drying kiln between the rows of stacked ware and said drying kiln having vents in the side walls at the level of the tunnel at the level of the shuttle car hearths to draw the drying gases from the center passages across the tunnel through the stacked ware and vent the same through the outlet passages in the side walls of the tunnel.

2. In combination a pair of tunnel kilns each separated by a partition wall with cross passages for equalizing pressure in the tunnel chambers each having a pair of parallel tracks extending longitudinally therethrough, parallel rows of shuttle cars mounted on said tracks for supporting clay shapes to be fired, the supporting surfaces of the cars constituting hearths, said cars being stationary during the firing and drying of said clay shapes, one of said kilns having a plurality of burners uniformly spaced along the longitudinal extent of the tunnel at both side walls thereof adjacent the hearth surfaces of the car and having an exhaust flue in the partition wall above said hearth surfaces with longitudinally spaced exhaust passages the full length of the tunnel, the burner ports and exhaust passages being at hearth level with the shuttle cars to cause the products of combustion from said burners to pass transversely of the tunnel only in separately controllable heating zones to maintain a uniform firing temperature throughout the transverse and longitudinal extent of said tunnel, the exhaust flue of said kiln being connected to conduct the products of combustion to the inlet passages at the center of the other of said kilns for drying the clay products stacked on the shuttle cars stationed therein, said drying kiln having a longitudinal passage in its partition wall below the level of the shuttle car hearths with spaced outlets at the level of the shuttle car hearths for directing the products of combustion from the first-named kiln to the drying chambers of the drying kiln and between the rows of stacked ware, and said drying kiln having vents in the side walls of the tunnel at the level of the shuttle car hearths to draw the drying gases from the center passages across the tunnel through the stacked ware and vent the same through the outlet passages in the side walls of the tunnel.

3. A pair of tunnel kilns as set forth in claim 2 in which the exhaust flue of the firing kiln is above the hearth level and wholly contained within said kiln and the inlet flue for the drying kiln is below the hearth level within the partition wall that divides the drying kiln into separate drying chambers for the double row of shuttle cars.

References Cited in the file of this patent

UNITED STATES PATENTS

| Number | Name | Date |
| --- | --- | --- |
| 736,929 | Brice | Aug. 25, 1903 |
| 1,275,352 | Zwermann | Aug. 13, 1918 |
| 1,298,125 | Underwood | Mar. 25, 1919 |
| 1,541,647 | Marlow | June 9, 1925 |
| 1,590,462 | Wilson et al. | June 29, 1926 |
| 1,615,217 | Dressler | Jan. 25, 1927 |
| 1,657,138 | Straight | Jan. 24, 1928 |
| 1,721,774 | Denison | July 23, 1929 |
| 1,838,672 | Hanley | Dec. 29, 1931 |
| 1,859,507 | Hanley | May 24, 1932 |
| 2,567,556 | Dressler et al. | Sept. 11, 1951 |

FOREIGN PATENTS

| Number | Country | Date |
| --- | --- | --- |
| 377,423 | France | Sept. 6, 1907 |